Figure 1:
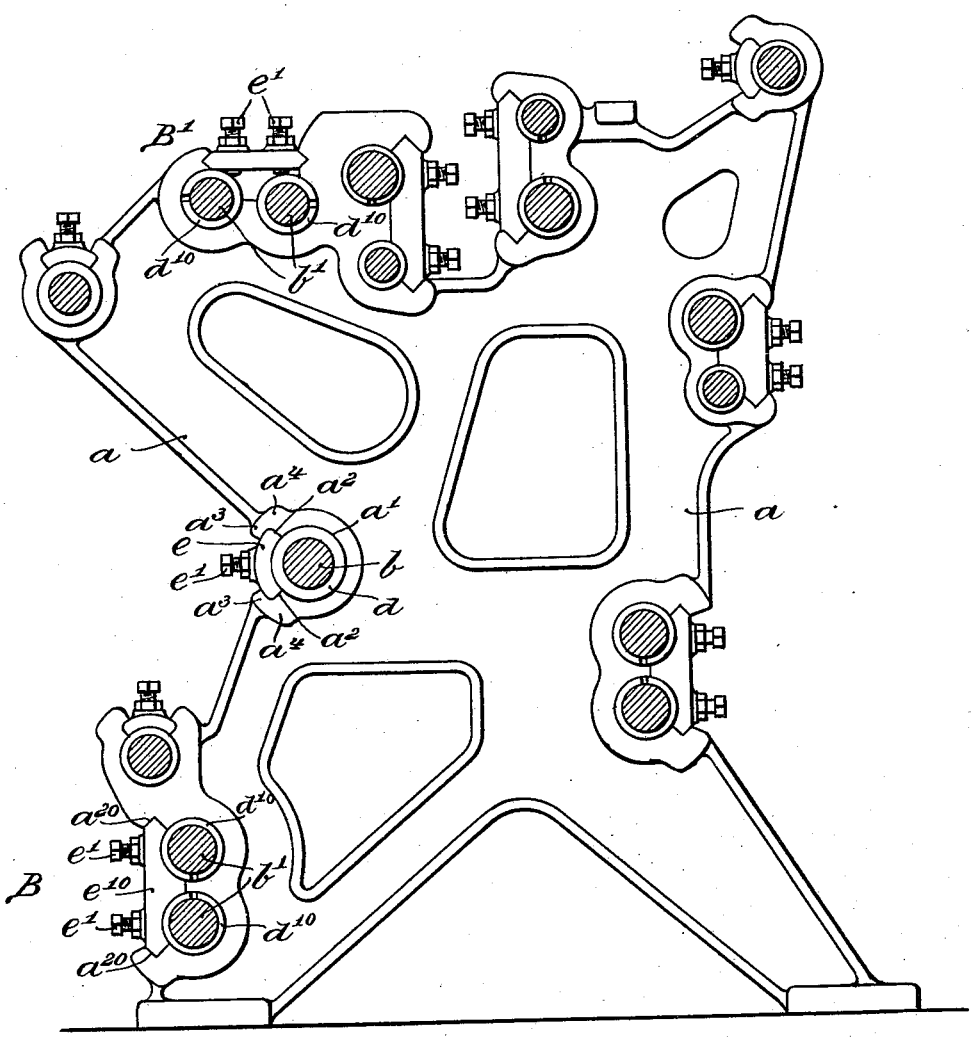

No. 742,905. PATENTED NOV. 3, 1903.
W. D. RICHTER.
BEARING.
APPLICATION FILED JAN. 10, 1903.
NO MODEL. 3 SHEETS—SHEET 1.

No. 742,905. PATENTED NOV. 3, 1903.
W. D. RICHTER.
BEARING.
APPLICATION FILED JAN. 10, 1903
NO MODEL. 3 SHEETS—SHEET 2.
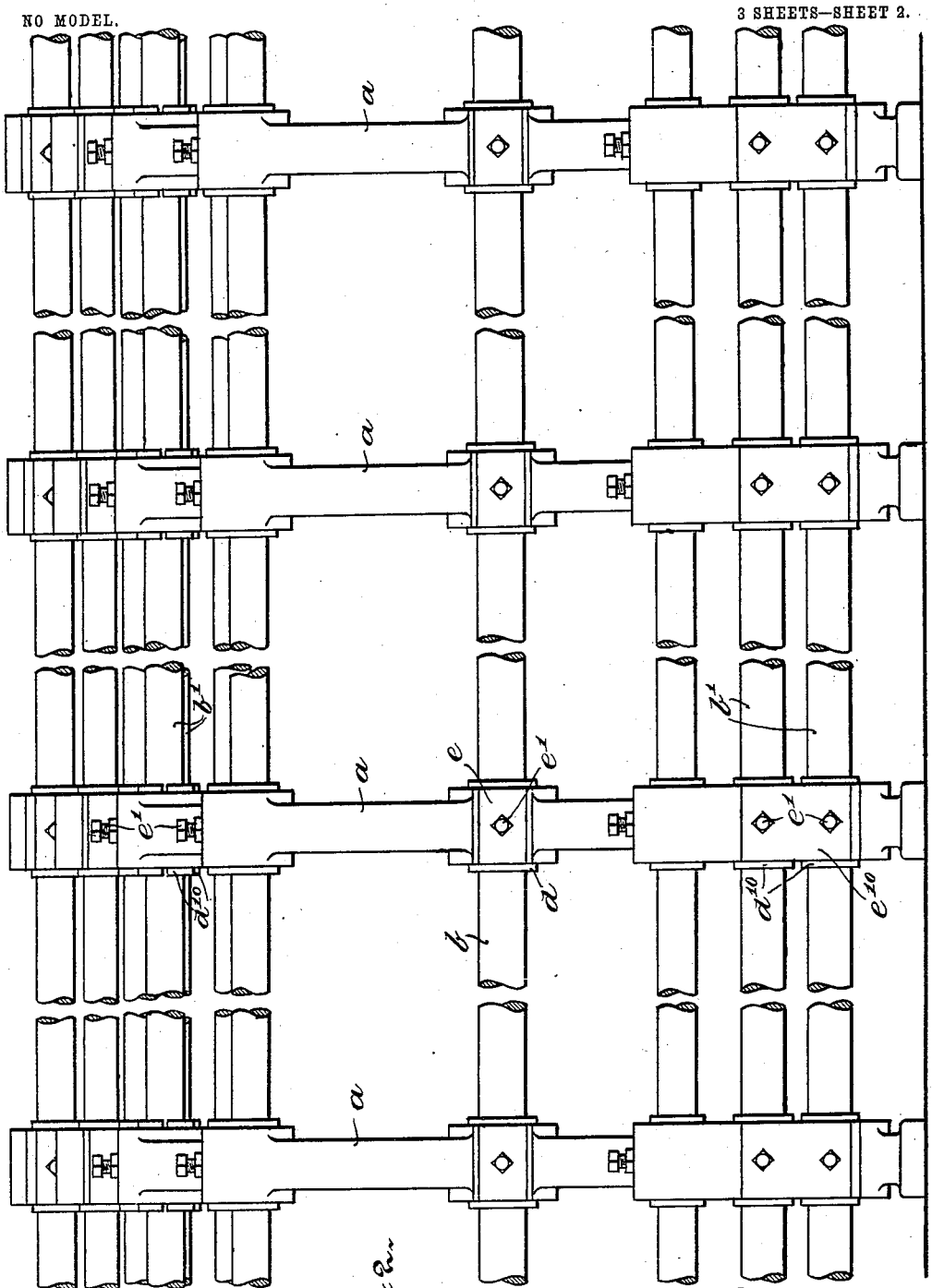

No. 742,905. PATENTED NOV. 3, 1903.
W. D. RICHTER.
BEARING.
APPLICATION FILED JAN. 10, 1903.
NO MODEL. 3 SHEETS—SHEET 3.
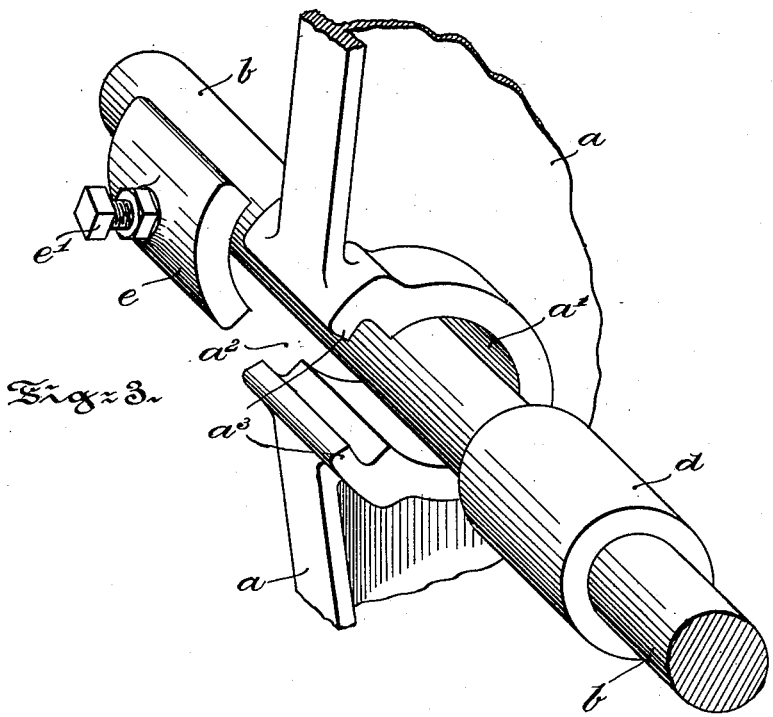
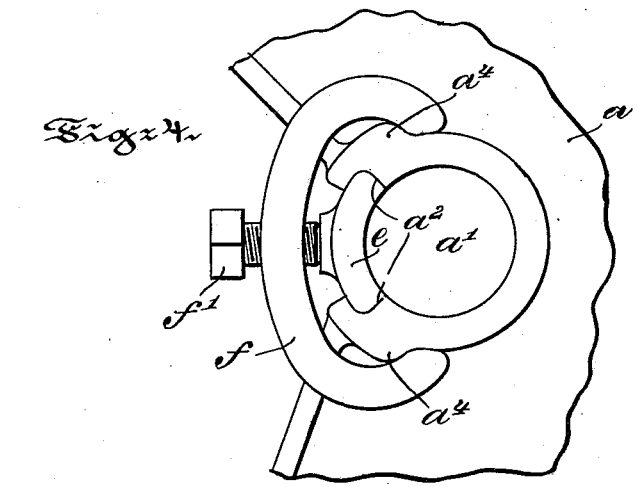

No. 742,905. Patented November 3, 1903.

UNITED STATES PATENT OFFICE.

WOLFGANG D. RICHTER, OF PHILADELPHIA, PENNSYLVANIA.

BEARING.

SPECIFICATION forming part of Letters Patent No. 742,905, dated November 3, 1903.

Application filed January 10, 1903. Serial No. 138,471. (No model.)

*To all whom it may concern:*

Be it known that I, WOLFGANG D. RICHTER, a subject of the Emperor of Germany, residing at the city of Philadelphia, in the county of Philadelphia and State of Pennsylvania, have invented certain new and useful Improvements in Bearings, of which the following is a specification.

My invention has relation to a bearing for long shafts—such, for instance, as the operating-shafts of a Cotton or straight-knitting machine, and in such connection it relates to the construction and arrangement of such a bearing.

Heretofore in the assembling or removal of shafts from long machines—such, for instance, as the Cotton or straight-knitting machine—great difficulty has been experienced both in the proper centering of the shafts as well as in the removal or replacement of the shafts in their bearings. As explained in a previous United States Letters patent, No. 688,265, granted to me under date of December 3, 1901, such machines as hosiery-machines and the like have shafts of great length, which require to be supported in a plurality of frames or standards. The bearings in the various frames must be nicely adjusted, so that a bearing in one frame may register accurately with the corresponding bearings in the remaining frames of the machine. Much time, labor, and expense were required prior to my invention of the said Patent No. 688,265 in the assemblage of the shafts. In the form illustrated in said patent the bearings were fixed and the shafts were not removable therefrom except by shifting longitudinally in the direction of the axis of the shaft. When the machine was in the shop, unless the shop was at least twice the required length it was impossible to so withdraw the shafts.

The principal object of my present invention is to still further improve the construction shown in my former patent, No. 688,265, by making the bearings separable, so as to permit of the withdrawal of a shaft from the machine by a movement at right angles to the longitudinal axis of the shaft.

The nature and scope of my invention will be more fully understood from the following description, taken in connection with the accompanying drawings, forming part hereof, in which—

Figure 1 is an end elevational view of a hosiery-machine having bearings embodying main features of my invention. Fig. 2 is a front elevational view of several of the frames, the shafts, and the bearings for said shafts. Fig. 3 is a perspective view, enlarged, of the bearing, the bearing-block, shaft, and bushing, illustrating the shaft in condition for removal from a frame of the machine; and Fig. 4 is a side elevational view, enlarged, of the frame, the removable bearing-block, and accessories, illustrating the manner in which the bearing-surface in the frame and block may be trued prior to the assembling of the shafts.

Referring to the drawings, $a$ represents one of the frames or standards of a hosiery-machine—such, for instance, as a Cotton or straight-knitting machine—and $b$ represents the series of long shafts rotating in said frame. At suitable points the perimeter of the frame $a$ is cut out, as at $a'$, in a rounded opening of a diameter larger than the diameter of a shaft $b$ to be fitted into said opening $a'$. The opening $a'$ is not completely circular, but has an arc-shaped mouth $a^2$, the chord of which is wider than the diameter of the shaft $b$ to be fitted in said opening, so as to permit the shaft $b$ to be moved in a direction at right angles to its axis into or out of the opening $a'$ through said mouth $a^2$. The mouth $a^2$ has a shoulder $a^3$ at either terminus formed adjacent to the opening $a'$, and it preferably has also on its exterior the shoulders $a^4$, for a purpose to be hereinafter explained. The frame $a$ is flanged at its front and around the periphery of the opening $a'$, so as to form at said opening $a'$ a relatively broad bearing-surface. Upon the shaft $b$ is accurately fitted a sleeve or bushing $d$, the outside diameter of which corresponds with the diameter of the opening $a'$. The sleeve or bushing $d$ permits the shaft $b$ to turn within the bushing with little friction, and it can also be slid longitudinally on the shaft $b$ when occasion requires. Into the mouth $a^2$ of the opening $a'$ is fitted a bearing-block $e$, the ends of which dovetail with the shoulders $a^3$ on the interior of said mouth $a^2$. The block $e$ is arranged to slide in a direction parallel to the shaft $b$ in said mouth, but cannot be withdrawn from the mouth $a^2$ by a movement at right angles to the axis of the shaft. A binding-screw $e'$ is arranged to traverse said block $e$ and to bear with its inner end upon the bushing $d$. In the assembling of the shafts in the machine the bushings $d$ are first placed on the shaft $b$ at points where they will not register with the mouths $a^2$ of the openings $a'$ of the frames. The shaft $b$ is then inserted in the openings $a'$, it passing readily through the mouth $a^2$ of each opening $a'$. The bushings $d$ are now slid on the shaft $b$ until they enter and fill out the openings $a'$. The blocks $e$ are now slid into the mouths $a^2$ and the binding-screws $e$ advanced to lock the sleeves or bushings to the bearings formed by the blocks $e$ and frames $a$. In withdrawing a shaft $b$ from the machine the reverse manipulation takes place—namely, the binding-screw $e'$ is withdrawn, the block $e$ is slid out of the mouth $a^2$, the bushing $d$ slid on the shaft $b$ until it is entirely out of the opening $a'$, and the shaft is then drawn out of the opening $a'$ by pulling it through the mouths $a^2$. This position of the parts is clearly illustrated in Fig. 3. Where two shafts $b$ are arranged side by side and close together, as at the parts marked B in Fig. 1 of the drawings, a single bearing-block $e^{10}$ may be used and the frame $a$ provided with two semicircular openings terminating in a single mouth $a^{20}$. In this instance the block $e^{10}$ is traversed by two binding-screws $e'$, one for each bushing $d$ of a shaft $b$. When a shaft is to be locked to the frames $a$ and to have no rotary movement therein, as at B', the construction and arrangement are precisely the same as hereinbefore explained with the exception that a split sleeve or bushing $d^{10}$ is used, which is tightened upon the shaft $b'$ by the binding-screw $e'$.

In Fig. 4 a means for truing up the bearings is illustrated. In this instance the block $e$ is first slid into the mouth $a^2$ of the opening $a'$, and a yoke or spanner $f$ is fixed to the outside shoulders $a^4$ of the mouth $a^2$. A binding-screw $f'$, passing through the yoke or spanner $f$, firmly binds the block $e$ in the mouth $a^2$. The circular opening or bearing-surface may now be drilled of required diameter and perfectly true in both the block $e$ and frame $a$.

By the foregoing construction and arrangement of the shafts of the machine when made of the same metal or materials of the same density, such as steel, very beneficial results are obtained. This is essentially important in that any variation in temperature affects the use of shafts made of different metals as to working in unison in the machine; but this is avoided by making the fixed shafts, as well as operating-shafts, of metal or materials of the same density, so as to control uniformly expansion and contraction of parts in the machine due to varying temperatures of the apartment in which the machines are operated, and thereby insuring great uniformity in the working of the respective shafts, as well as maintaining in unison other parts of the machine.

Having thus described the nature and object of my invention, what I claim as new, and desire to secure by Letters Patent, is—

In a machine having a plurality of frames arranged to support long operating-shafts, bearings for the shafts arranged in each frame so as to register respectively with each other throughout all the frames, each bearing comprising an opening having an arc-shaped mouth the chord of which is wider than the diameter of the shaft entering the opening, said mouth forming an entrance for the shaft into the opening, a bushing for each opening arranged to slide upon the shaft and of a diameter substantially coequal with the opening in the frame, a bearing-block arranged to slide in the mouth of the opening parallel to the shaft, and means traversing the block and adapted to lock the bushing to said block.

In testimony whereof I have hereunto set my signature in the presence of two subscribing witnesses.

WOLFGANG D. RICHTER.

Witnesses:
J. WALTER DOUGLASS,
THOMAS M. SMITH.